United States Patent Office 3,329,718
Patented July 4, 1967

---

3,329,718
PREPARATION OF FORMALDAZINE
Henry Moe, Sacramento, and Bernard B. Lampert, Carmichael, Calif., assignors, by mesne assignments, to the United States of America as represented by the Secretary of the Navy
No Drawing. Filed Oct. 6, 1966, Ser. No. 585,221
1 Claim. (Cl. 260—566)

ABSTRACT OF THE DISCLOSURE

A direct method for the preparation of formaldazine which consists in reacting one mole of hydrazine and two moles of formaldehyde in the presence of paratoluenesulfonic acid. The product is used in the synthesis of a gas-forming substance useful in propellant binder systems.

---

The present invention relates to a method for the direct synthesis of formaldazine or 2,3-diazabuta-1,3-diene.

In the field of propellant chemistry much work has been done to synthesize highly reactive nitrogen-rich compounds for use as additives to improve the density and specific impulse of propellant systems. Formaldazine is such a nitrogen-rich compound. It was first described by Neureiter in 1959 as a pyrolysis product of an amorphous hydrazine-formaldehyde polymer prepared by Pulvermacher in 1893. Neureiter in his U.S. Patent No. 3,067,252, issued Dec. 4, 1962, discloses a method for preparing formaldazine or 2,3-diazabuta-1,3-diene by pyrolysis of a hydrazine-formaldehyde polymer which is probably poly(dimethylenetetraformaltrisazine). The present method is for direct synthesis from hydrazine and formaldehyde.

An object is to provide a potentially inexpensive method for preparing formaldazine which can be used in the synthesis of gas-forming substances with endothermic heats of formation useful in propellant systems as binders, solid additives, or plasticizers.

Other objects, features, and many of the attendant advantages of the invention will become readily understood by reference to the following detailed description.

In accordance with the present invention formaldazine or 2,3-diazabuta-1,3-diene was prepared directly by reacting one mole of hydrazine and two moles of formaldehyde in solution at below 0° C. in the presence of the catalyst, paratoluenesulfonic acid.

To a stirred solution of 32 g. (1 mole) of anhydrous hydrazine in 150 g. of chloroform maintained at −30° C. was added 113 g. (2 moles) of Methyl Formcel (the tradename for a solution consisting of about 53% formaldehyde in methanol). Then 1 g. of p-toluenesulfonic acid catalyst was added, and the solution which was kept at 0° C. for 3 hours separated into an aqueous methanol layer, A, and a chloroform layer, B. The aqueous methanol layer was extracted with 100 ml. of chloroform at 0° C. for 2 hours, at which time the contents of the upper layer polymerized to poly(dimethylenetetraformaltrisazine). Evaporation of the chloroform extract yielded 7 g. of residue, apparently, derived from polymerization of the formaldazine which was extracted. Formaldazine is a liquid, having a M.P. of −48±3° C.

The original chloroform B layer (193 g.) was stirred at −40° C. while a stream of hydrogen sulfide was bubbled beneath its surface during a 2-hour period. The solution was stored at −75° C. for 18 hours then allowed to warm to room temperature and filtered. Concentration of the filtrate yielded 24 g. of residue. Sublimation of the residue at 50° C./0.05 mm. Hg pressure gave 5.5 g. of 1,3,4-thiadiazolidine as white crystals with a M.P. of 88–90° C. Neureiter reported a M.P. of 86–91° C. for this compound prepared in a similar manner.

The theoretical yield of formaldazine was 56 g. By subtraction of 33 g. of material isolated from the aqueous methanol layer, there was theoretically 23 g. of formaldazine in the chloroform layer. The 5.5 g. of thiadiazolidine represented a 15% conversion of formaldazine.

The reaction may be represented by the following unbalanced equation:

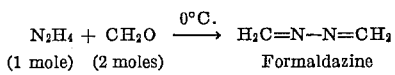

$$N_2H_4 + CH_2O \xrightarrow{0°C.} H_2C=N-N=CH_2$$
(1 mole)  (2 moles)             Formaldazine The judicious choice of solvents such as methanol and chloroform, and para-toluenesulfonic acid as the catalyst is important to the method of synthesizing formaldazine directly from its components.

Obviously many modifications and variations of the present invention are possible in the light of the above teachings. It is therefore to be understood that within the scope of the appended claim the invention may be practiced otherwise than as specifically described.

What is claimed is:

A process for the synthesis of formaldazine which comprises reacting one mole of hydrazine in chloroform solution with two moles of formaldehyde in methanol solution in the presence of a small amount of p-toluenesulfonic acid at 0° C. for 3 hours.

References Cited

Walker, Formaldehyde, Reinhold Pub. Corp., New York, 1953, pages 184 to 185.

CHARLES B. PARKER, *Primary Examiner.*

CARL D. QUARFORTH, *Examiner.*

L. A. SEBASTIAN, R. HINES, *Assistant Examiners.*